US011581562B2

(12) United States Patent
Li

(10) Patent No.: US 11,581,562 B2
(45) Date of Patent: Feb. 14, 2023

(54) Z-SCHEME MICROBIAL PHOTOELECTROCHEMICAL SYSTEM (MPS) FOR WASTEWATER-TO-CHEMICAL FUEL CONVERSION

(71) Applicant: Yat Li, Fremont, CA (US)

(72) Inventor: Yat Li, Fremont, CA (US)

(73) Assignee: The Regents of the University of California, Oakland, CA (US)

( * ) Notice: Subject to any disclaimer, the term of this patent is extended or adjusted under 35 U.S.C. 154(b) by 311 days.

(21) Appl. No.: 16/868,380

(22) Filed: May 6, 2020

(65) Prior Publication Data

US 2021/0351427 A1  Nov. 11, 2021

(51) Int. Cl.
| | | |
|---|---|---|
| *H01M 8/16* | (2006.01) | |
| *C02F 3/00* | (2006.01) | |
| *C02F 1/30* | (2006.01) | |
| *C25B 1/55* | (2021.01) | |
| *C25B 1/04* | (2021.01) | |
| *C02F 1/72* | (2023.01) | |
| *C25B 11/031* | (2021.01) | |
| *C25B 11/051* | (2021.01) | |
| *C25B 11/057* | (2021.01) | |
| *C25B 11/077* | (2021.01) | |

(52) U.S. Cl.
CPC ............ *H01M 8/16* (2013.01); *C02F 1/30* (2013.01); *C02F 1/725* (2013.01); *C02F 3/005* (2013.01); *C25B 1/04* (2013.01); *C25B 1/55* (2021.01); *C25B 11/031* (2021.01); *C25B 11/051* (2021.01); *C25B 11/057* (2021.01); *C25B 11/077* (2021.01); *C02F 2305/10* (2013.01)

(58) Field of Classification Search
None
See application file for complete search history.

(56) References Cited

U.S. PATENT DOCUMENTS

2005/0274623 A1  12/2005  Soler Turu
2016/0024664 A1*  1/2016  Krauss ................. C25B 1/02
                                                   422/186.04

FOREIGN PATENT DOCUMENTS

JP         5605994      10/2014

OTHER PUBLICATIONS

Wang et al. "Self-Biased Solar-Microbial Device . . . " ACS Nano 2013 7(10):8728-8735.

(Continued)

*Primary Examiner* — Wojciech Haske
(74) *Attorney, Agent, or Firm* — Lumen Patent Firm

(57) ABSTRACT

A wastewater to chemical fuel conversion device is provided that includes a housing having a first chamber and a second chamber, where the first chamber includes a bio-photoanode, where the second chamber includes a photocathode, where a backside of the bio-photoanode abuts a first side of a planatized fluorine doped tin oxide (FTO) glass, where a backside of the photocathode abuts a second side of the FTO glass, where a proton exchange membrane separates the first chamber from the second chamber, where the first chamber includes a wastewater input and a reclaimed water output, where the second chamber includes a solar light input and a $H_2$ gas output, where the solar light input is disposed for solar light illumination of the first chamber and the second chamber.

11 Claims, 8 Drawing Sheets

(56) References Cited

OTHER PUBLICATIONS

Ling et al. "The influence of oxygen content of the thermal activation . . . " Angewandte Zuschriften 2012 124:4150-4155.
Paracchino et al. "Highly active oxide photochathode . . . " Nature Materials May 8, 2011 10: 456-461.

* cited by examiner

PEC          MFC

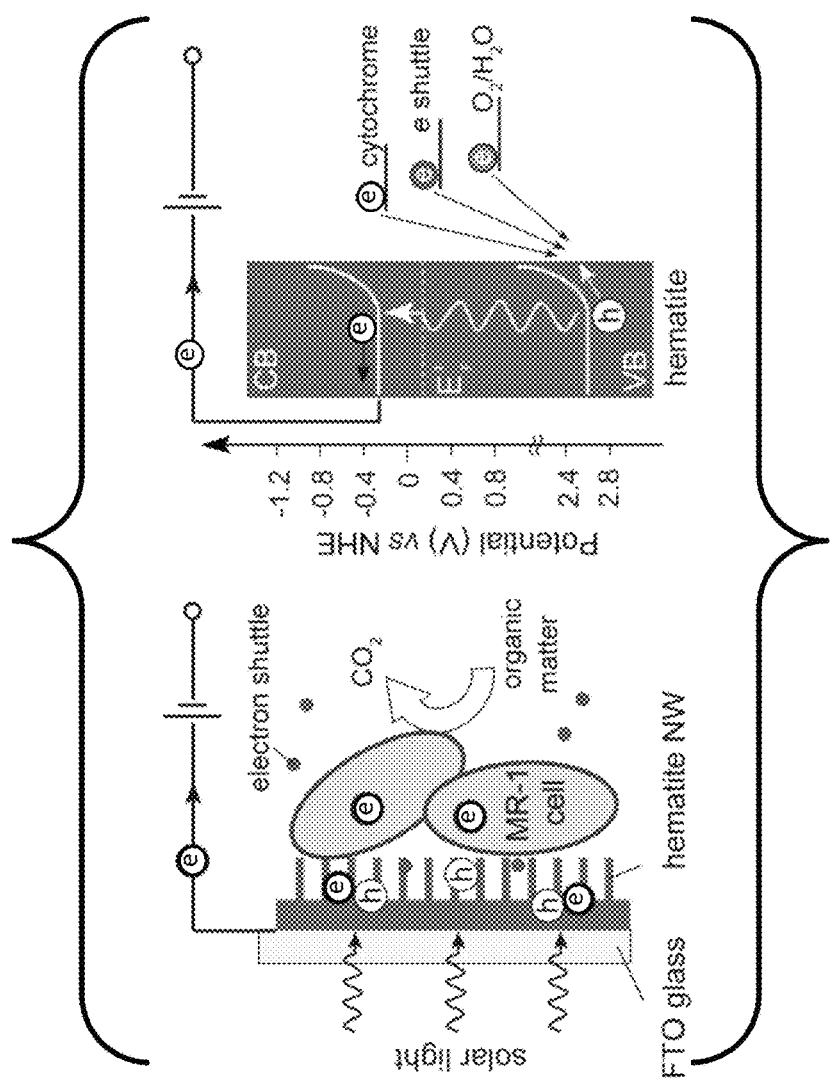
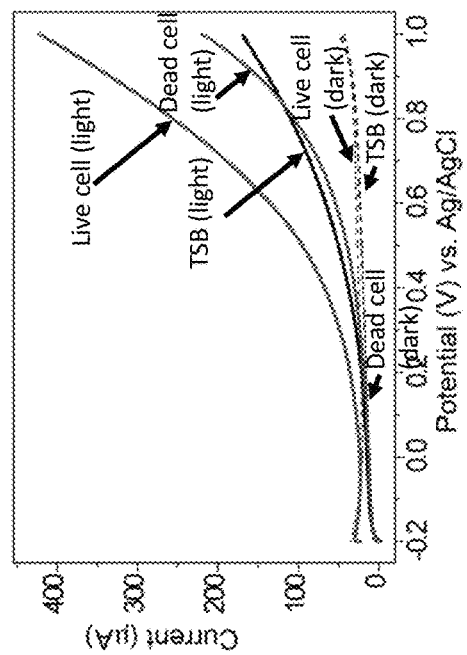
FIG. 4A
FIG. 4B

Z-SCHEME MICROBIAL PHOTOELECTROCHEMICAL SYSTEM (MPS) FOR WASTEWATER-TO-CHEMICAL FUEL CONVERSION

STATEMENT OF GOVERNMENT SPONSORED SUPPORT

This invention was made with Government support under contract CBET-1034222 awarded by the National Science Foundation. The Government has certain rights in the invention.

CROSS-REFERENCE TO RELATED APPLICATIONS

This application is a continuation of U.S. patent application Ser. No. 15/743,531 filed Jan. 10, 2018, which is incorporated herein by reference. U.S. patent application Ser. No. 15/743,531 application is a 371 of PCT/US2016/031440 filed on May 9, 2016. PCT/US2016/031440 filed on May 9, 2016 claims the benefit of U.S. Provisional application 62/198,280 filed on Jul. 29, 2015.

FIELD OF THE INVENTION

The current invention relates to microbial electrohydrogenesis. More specifically, the invention relates to solar-assisted microbial electrohydrogenesis by integrating two semiconductor photoelectrodes with a conventional microbial fuel cell (MFC) device.

BACKGROUND OF THE INVENTION

With the drastic increase of human population, there is an ever-growing demand for energy and clean water for the continuous economic growth and suitable inhabitation on earth. Over the years, federal government has applied distinct strategies to address these two needs separately: the municipal wastewater is collected by local wastewater plants for purification and subsequent reuse as reclaimed water, while the energy source is mainly based on natural gas, and crude oil. Apparently, these two strategies are decoupled. Millions tons of wastewater is produced from industrial and agricultural operations each year, and about 25 billion US dollars are spent annually for wastewater treatment in the United States alone.[2] Meanwhile, the use of natural gas/petroleum generates a lot of greenhouse gas and toxic chemicals, which poses a serious threat to the environment, and also leads to additional cost to treat the pollution.

FIG. 1 shows a schematic drawing integrating photocatalysis with microbial metabolism to remediate wastewater and produce chemical fuels. The wastewater treatment and energy recovery can simultaneously be achieved by microbial fuel cell (MFC) technology. For instance, microbial electrohydrogenesis process has been experimentally demonstrated in microbial electrolysis cell (MEC) using a wide range of microorganisms with various organic nutrients to produced hydrogen. However, thermodynamic constraints limit microbial electrogensiss and hydrogen production occur simultaneously without the addition of an external bias. To overcome the thermodynamic constrains, an external bias is usually applied to sustain the current/hydrogen generation. Nevertheless, the need of external bias reduces the overall energy recovery ratio and adds to the complexity and cost for hydrogen production, making microbial electrohydrogenesis less attractive as an energy solution. Considerable efforts have been made on optimization of MEC reactors, design of anodes, and catalysts to reduce the above-mentioned energy losses. Alternatively, to obtain the required energy from a renewable energy source is also a promising approach that can fundamentally address the issue.

Previously reported is a dye-sensitized solar cell (DSSC)-powered microbial electrolysis cell (MEC). The MEC was a conventional dual chamber device with the anode inoculated with anaerobic digester sludge from a sewage treatment plant and acetate was fed as the electron donor. The MEC was integrated with a conventional DSSC device composed of a ruthenium dye-loaded $TiO_2$ nanoparticle film as working electrode and a platinized FTO glass as counter electrode. The DSSC device harvests sunlight to provide the required energy for hydrogen production. However, Ru is a rare and expensive element, which renders this approach to be unsustainable.

A prior art hybrid device is shown that includes a photoelectrochemical cell (PEC) device and a MFC device. Significantly, this hybrid device generates hydrogen gas at zero external bias using biodegradable organic matters and sunlight as the only energy sources. Shown in FIG. 2A, is a prior art PEC device composed of a $TiO_2$ photoanode and a Pt cathode. The MFC is an air-cathode dual-chamber device, inoculated with either *Shewanella oneidensis* MR-1 (batch-fed on artificial growth medium) or natural microbial communities (batch-fed on local municipal wastewater). Under light illumination, the $TiO_2$ photoanode provides a photovoltage of ~0.7 V that overcomes the thermodynamic barrier for microbial electrohydrogenesis. As a result, a pronounced current generation and sustainable production of hydrogen gas (FIG. 2B). This hybrid device (with wastewater as anolyte) achieved only a decent solar conversion efficiency of ~1% at zero external bias under one sun illumination, and only fair soluble chemical oxygen demand (SCOD) removal rate of ~200 mg/L/day, which is comparable to the efficiency of some conventional microbial devices. The originally black wastewater can eventually turn into almost clear solution. Taken together, this hybrid device holds great promise of being set up in remote/rural areas, without electricity and fuel supplies, for self-sustained wastewater treatment and chemical fuel production.

A solar-assisted microbial device has been successfully demonstrated by the inventors. For instance, the hybrid MFC-PEC device achieved the overall solar-to-hydrogen conversion efficiency of ~1%, which is very promising given that the device was operated in a sustainable manner using sunlight and wastewater as the only energy sources. What is needed is improvement in the performance of an MPS by enhancing the charge generation and collection processes.

There is urgent need to employ energy-efficient processes for wastewater treatment, and simultaneously recover the "wasted energy" contained as organic matters in wastewater.

SUMMARY OF THE INVENTION

To address the needs in the art, a wastewater to chemical fuel conversion device is provided that includes a housing having a first chamber and a second chamber, where the first chamber includes a bio-photoanode, where the second chamber includes a photocathode, where a backside of the bio-photoanode abuts a first side of a planatized fluorine doped tin oxide (FTO) glass, where a backside of the photocathode abuts a second side of the FTO glass, where a proton exchange membrane separates the first chamber from the second chamber, where the first chamber includes a wastewater input and a reclaimed water output, where the second chamber includes a solar light input and a $H_2$ gas output, where the solar light input is disposed for solar light illumination of the first chamber and the second chamber.

In one aspect of the invention, the bio-photoanode includes hematite ($\alpha$-$Fe_2O_3$) nanowires.

In another aspect of the invention, the bio-photoanode includes electrogenic bacterial strains.

In a further aspect of the invention, the bio-photoanode has a semiconductor material that can include $TiO_2$, $Fe_2O_3$, $WO_3$, ZnO, or $BiVO_4$.

According to one aspect of the invention, the photocathode has a semiconductor material that can include InGaN, GaN, InP, GaP, Si, $Cu_2O$, or $CuBi_2O_4$.

In yet another aspect of the invention, the photocathode is compatible with an anoxic buffered solution.

BRIEF DESCRIPTION OF THE DRAWINGS

FIGS. 4A-4B show 3A a schematic configuration of a hematite based bio-photoanode device highlighting the electrons generated from photoanode, bacteria and electron shuttle, with the photoexcited holes generated from photoanode, 4B an example of linear sweep voltammograms collected from a hematite based bio-photoanode device in the presence of live bacteria, dead bacteria, and absence of bacteria, at a scan rate of 20 mV/s in the dark (dashed lines) and under one sun illumination (100 mW/$cm^2$, solid lines).

DETAILED DESCRIPTION

Figure 1:
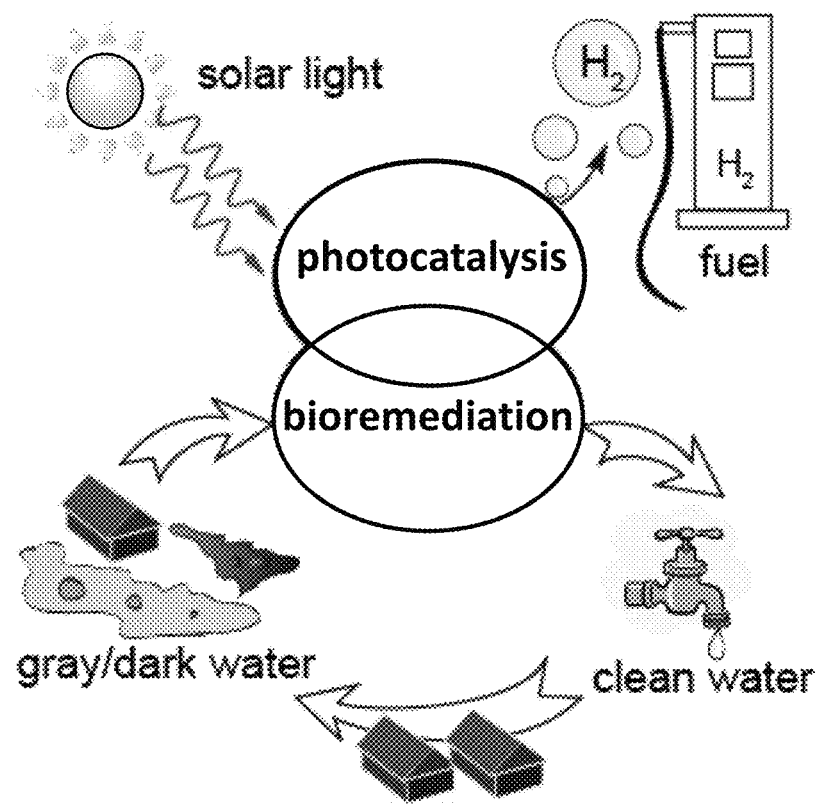
FIG. 1 shows a schematic drawing integrating photocatalysis with microbial metabolism to remediate wastewater and produce chemical fuels.
Figure 2A:
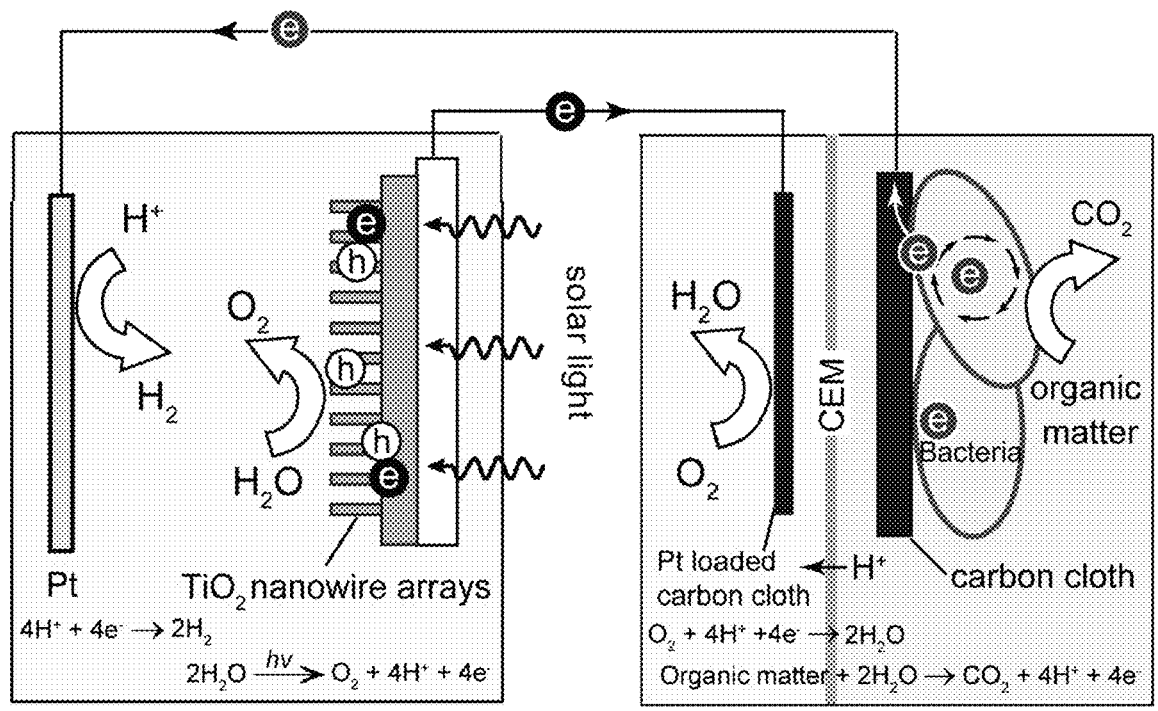
FIGS. 2A-2B show 2A a schematic configuration of a prior art MPC device, wherein shown are the electrons generated from photoanode and bacteria, respectively, and 2B shows a linear sweep voltammograms collected from a PEC device and a PEC-MFC device, at a scan rate of 20 mV/s in the dark and under one sun illumination (100 mW/$cm^2$).
Figure 2B:
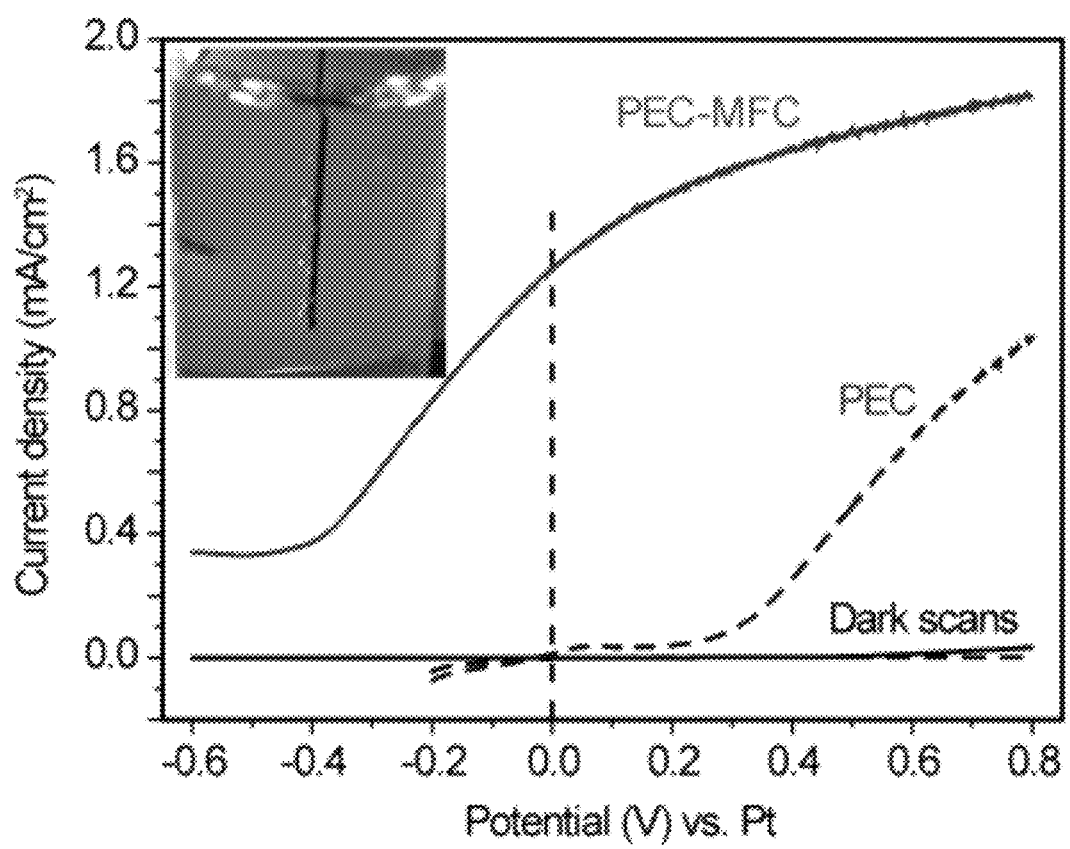

The current invention provides a self-sustained microbial photochemical system (MPS) that removes soluble chemical oxygen demand (SCOD) in wastewater and simultaneously recovers the "wasted energy" stored in the organic wastes for photochemical generation of chemical fuels. Provided is a hydrogen gas production, solar-assisted microbial device using municipal wastewater and sunlight as the sole energy sources. According to one embodiment, the invention provides fundamentally new MPS architecture referred to herein as a "Z-scheme" MPS, in which a bio-photoanode is interfaced with a semiconductor photocathode. The invention provides chemical fuel generation in a sustainable manner by using a Z-scheme MPS that operates in an outdoor environment under natural sunlight illumination with continuous flow of wastewater.

The current invention provides solar-assisted microbial electrohydrogenesis by integrating semiconductor photoelectrode with conventional MFC device. The current invention couples a photocathode with bioanode by matching the redox potentials of bacterial cells and the electronic bands of semiconductor. In one embodiment, the device generates a pronounced current in short-circuit configuration (measured at zero external bias) under modest white light illumination of 20 mW/$cm^2$.

To improve device performance, the invention incorporates a bio-anode with semiconductor material in a MFC device, where the amount of charges produced on bio-anode and photoelectrode are matched. Until now, the charge generation and collection on the bio-anode was the limiting factor for the overall efficiency of the microbial electrohydrogenesis reaction. The current invention addresses this issue through an increase in the availability of "bio-electrons" by increasing the number and/or the activity of microorganism. Further, the overall efficiency is improved by enhancing the charge collection efficiency of the bio-anode. The latter aspect is particularly important for the MPS operated in continuous flow mode, where the availability of bio-electrons is typically in excess. The current invention increases the collection efficiency of bio-electrons from a material perspective.

A key aspect of the solar-assisted microbial device of the current invention is the utilization of solar energy to facilitate the microbial process. Here, the solar light harvesting capability of the photoelectrode is central to the success of the solar-microbial approach. Previously, the light harvesting capability and photovoltage of the solar-microbial devices was limited by the single band-gap system. The current invention increases the photovoltage and light absorption of MPS by providing a fundamentally new device of a "free-standing" MPS, which requires neither electrodes nor ion exchange membrane. According to one embodiment hydrogen gas is generated photochemically in a sustainable manner when the free-standing MPS is dispersed into wastewater under sunlight illumination.

According to one embodiment, a cost-effective microbial device is provided that increases efficiency, e.g. SCOD removal rate and power production, and lowers the material, fabrication and operation cost. The current invention improves the energy conversion efficiency of MPS using free-standing MPS for photochemical hydrogen production for providing a sustainable energy solution.

Previous WC studies have primarily focused on the modification of microorganisms and culture conditions, in order to increase the generation of bio-electrons from biological approach. The current invention relies on the fact that the electron transfer between the electrode and bacteria plays an equally important role in determining the device efficiency. For instance, the effective surface area, electrical conductivity and chemical nature of the electrode are all directly related to the charge collection efficiency of bio-anode, and thus, the current generation of MFCs.

The collection efficiency of bio-electrons depends on two key factors, the contact area between bacteria and electrode as well as the charge transfer rate at the interface. The current invention addresses this in two approaches. First, a three-dimensional (3D) conductive nanomaterial is provided for the bio-anode. In comparison to conventional carbon electrodes (e.g., carbon cloth, carbon felt, and carbon paper), the 3D electrode provides not only a larger accessible surface area for microbial colonization and electron mediators, but also a uniform macro-porous scaffold for effective mass diffusion of the culture medium. Second, the bacteria/electrode interfacial charge transfer is increased by replacing the conventional carbon electrodes with a semiconductor photoanode. Under light illumination, the photoelectrode provides a large driving force for bio-electron transfer from bacteria to the electrode.

Figure 3A:
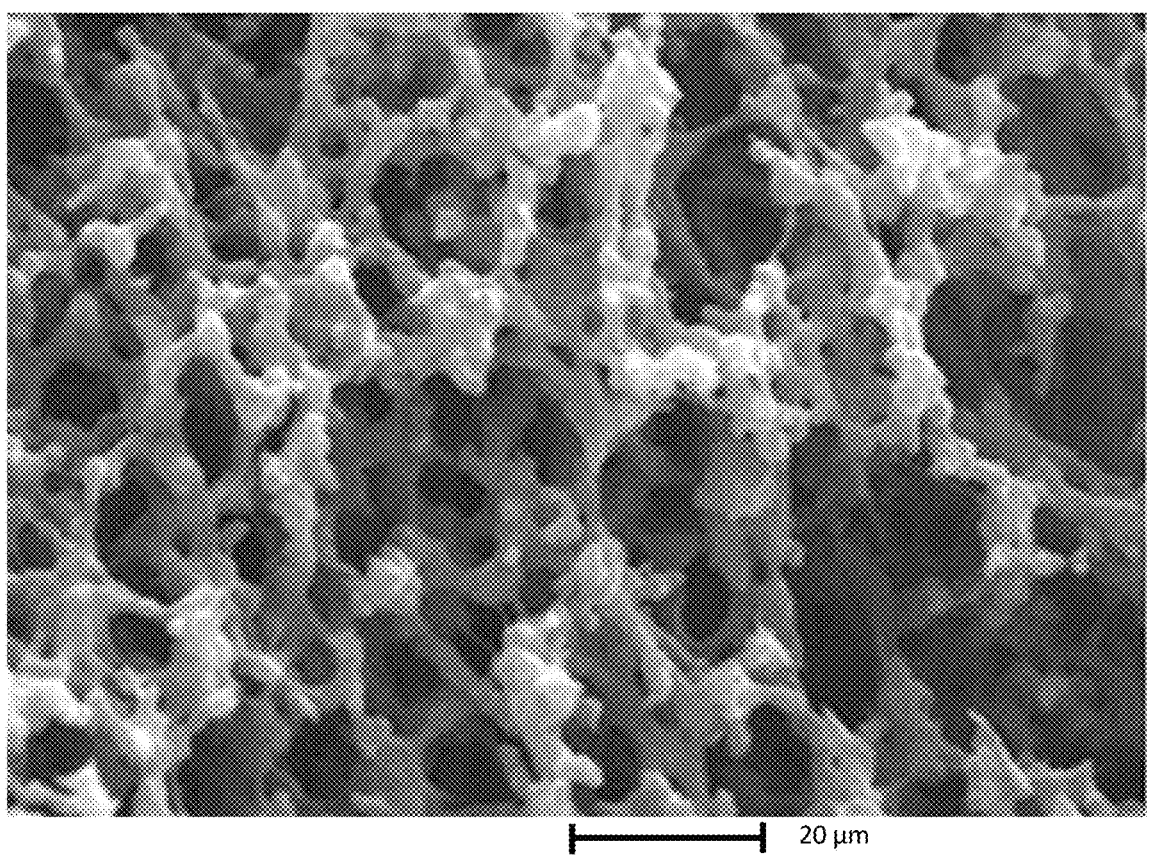
FIGS. 3A-3B show 3A SEM image of carbon aerogel, and 3B pore size distribution.
Figure 3B:
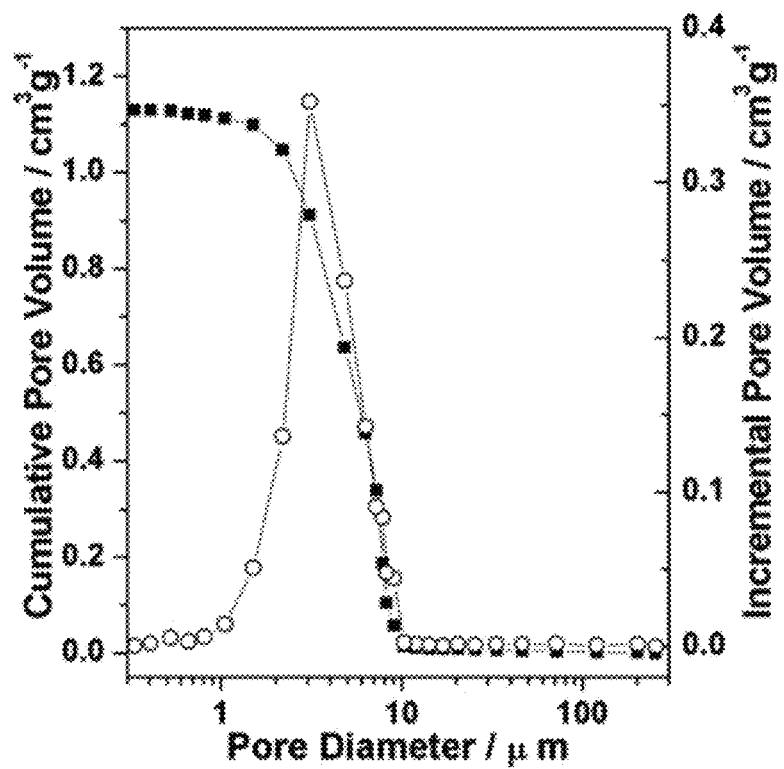

Turning now to the 3D bio-anode, carbon-based materials such as carbon cloth, carbon paper, carbon felt and graphite brush are most commonly used anode materials for MFCs. These commercially available electrode materials are chemically inert, highly conductive and inexpensive. However, these microstructures have relatively small surface area for microbial colonization, and thus, limit the power density of WC device. The current invention enhances the MFC by modifying the electrodes with nanostructures to increase the accessible surface area for bacterial colonization. A flexible WC anode has been investigated by employing nickel foam as a 3D conducting scaffold and coated with reduced graphene oxide sheets to increase its accessible surface area for bacteria and electron mediators. The 3D anode produces a substantially enhanced volumetric power density than that of plain nickel foam and conventional carbon based electrodes measured in the same conditions. Nevertheless, the relatively high cost and heavy weight of nickel foam compared to carbon materials limit its application as electrode. To address this a low-cost carbon aerogel material is provided as an electrode for MPS, according to one embodiment. Carbon aerogel is a 3D conductive scaffold with very low mass density (0.18 to 10 mg/cm$^2$), high porosity (over 50%) and extremely large surface areas (up to ~3000 m$^2$/g). The cost of carbon aerogel is estimated to be less than $1 per dm$^3$. The mixture of a number of different size of pores in carbon aerogel is beneficial for serving as a bio-electrode. The large pores with diameter >500 nm allow for efficient diffusion of bacteria, while the small pores enhance the interfacial surface area between electrode and molecular electron shutters present in the solution. The carbon aerogel electrode outperforms the conventional carbon based electrodes as well as previously reported 3D electrodes. A carbon aerogel with macro-pores ranging from 0.5 to 10 μm as the conductive scaffold for bacteria colonization has been synthesized, as shown in FIGS. 3A-3B. This low-cost hydrothermal fabrication method used is also feasible to scale up the fabrication of carbon aerogel for MPS with increasing scale. The size of carbon aerogel is only practically limited by the size of container for hydrothermal reaction.

In one embodiment, n-type semiconductor materials are provided as a bio-photoanode to replace the conventional carbon electrode. The bio-photoanode not only extracts "bio-electrons" from bacteria, but also generates photoexcited electrons by harvesting sunlight. A key aspect of the invention is a microbial device utilizing the combination of a photoanode and microbes. Until now it was the conventional thinking that the semiconductor electrode is more resistive compared to carbon or metal electrodes, and that semiconductor materials are toxic to the microbial communities when they are not stable in the microbial culture that could be acidic, basic or redox active.

The current invention provides the combining of a photoanode with microbes within a single functional device by selecting the semiconductor/microbe system carefully. FIG. 4A shows a schematic drawing of the MPS configuration and the working mechanism of the bio-photoanode. In the dark, the semiconductor material simply functions as a conductive electrode. The bio-electrons generated from bacteria and/or electron shutters will transfer to the conduction band (CB) of the semiconductor, however, this electron transfer process is expected to be slow due to the small potential difference between the redox potential of microbes and CB of the photoanode. In contrast, the interfacial charge transfer can be substantially improved under light illumination, which creates a lot of photoinduced holes in the low lying semiconductor valence band (VB). The recombination of bio-electrons with these photoinduced holes is highly favorable due to the large potential difference (FIG. 4A, right). This process is facilitates the photoinduced electron-hole separation and improves the yield of long lived photoinduced electrons for reduction reaction on the counter electrode. Therefore, the photoanode functions as an electron sink to enhance the collection of bio-electrons.

Hematite ($\alpha$-Fe$_2$O$_3$) has a favorable bandgap (2.1 eV) for solar absorption, and it is photochemically stable in neutral/basic pH and neutral/oxidative conditions. Additionally, the material and production cost of hematite (iron rust) is low, and it is biocompatible with most common bacterial strains. Because poor electrical conductivity of hematite affects the transport and collection of bio-electrons, hematite nanowires are implemented and chemically modified to increase their electrical conductivity, according to one embodiment of the invention. In one example, *Shewanella* MR-1 is used because it is a model electrogenic bacteria for bioelectricity production, and it is a facultative strain that does not require strict anaerobic growth environment. FIG. 4B shows a comparison of the linear sweep voltammograms collected from a hematite based bio-photoanode device in the presence of live bacteria, dead bacteria, and in the absence of bacteria. Significantly, in the presence of live bacteria, the device current is substantially higher than the other two samples, in the entire potential window. The enhanced current is believed to be due to the extra bio-electrons provided by the live bacteria. More importantly, these results show that a semiconductor can be used as anode for bacteria colonization, and the electron transfer between bacteria and photoanode is possible. Moreover, the photoanode under light illumination improves the collection of electrons from bacteria and electron shutters, compared to the conventional carbon electrodes. It also suggests that a smaller size of photoanode can potentially achieve the same charge collection efficiency as a large carbon electrode.

According to the current invention, the driving force for the charge transfer under light illumination is related to the potential difference between the semiconductor VB and the bacteria oxidation potential. Bio-electrons generated by live bacteria are injected into the hematite to recombine with the photoinduced holes, which block the electron-hole recombination path in hematite, and thus the excited state lifetime in the presence of live bacteria is relatively longer lived compared to that in the presence of dead bacteria and the absence of bacteria. Furthermore, electron-transfer rate constant ($k_{et}=1/\tau_2-1/\tau_1$) at the interface of bacteria and hematite photoanode can be calculated based on their lifetimes.

Figure 5:
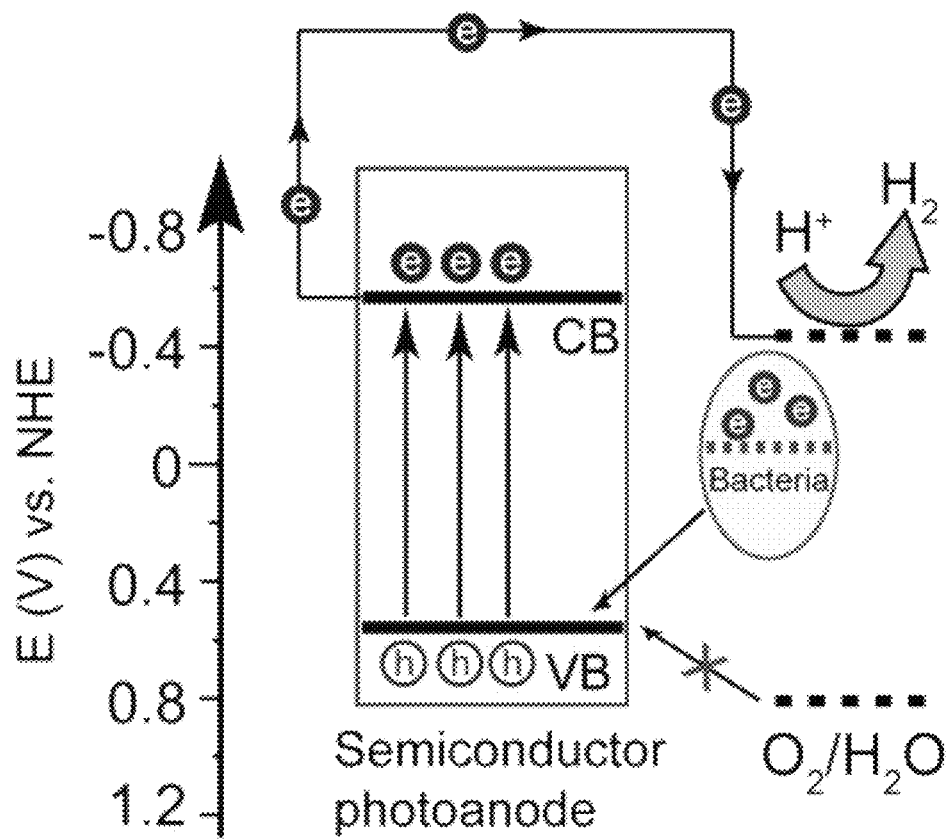
FIG. 5 shows a schematic diagram illustrating the mechanism of solar assisted microbial electro-hydrogenesis using a photoanode.

From the hematite photoanode, other semiconductor materials for photoanode are possible for achieving a goal of microbial electrohydrogenesis at zero bias. To achieve spontaneous microbial electrohydrogenesis, the CB of the semiconductor should be more negative than the proton reduction potential (−0.41 V vs. normal hydrogen electrode NHE at pH 7), while its VB should be more positive than the bacteria oxidation potential (see FIG. 5). It is noteworthy that direct water splitting is often limited by the very positive water oxidation potentials as well as the high over-potential for oxygen evolving reaction. Significantly, this harsh criterion can be relaxed in the presence of bacteria because they have a much more negative oxidation potential than water oxidation. Bacteria serve as a "bio-catalyst" for oxidizing organic matters in wastewater to produce electrons, which can further transfer to the VB of photoanode and recombined with photoinduced holes. The current invention includes semiconductors with CB located at highly negative potential (compared to proton reduction potential) that can achieve self-biased microbial electrohydrogenesis.

The current invention demonstrates for the first time a bio-photoanode for spontaneous microbial electrohydrogenesis, which revolutionizes the design of MPS. By replacing the conventional carbon electrode with a semiconductor photoelectrode, the charge transfer and collection efficiency at the interface between bacteria and electrode are substantially enhanced under light illumination. Furthermore, the bio-photoanode also provides a versatile platform for probing the electron transfer rate of bio-electrons using time-resolved laser spectroscopy, which provides important insights into how the bacteria interact with inorganic semiconductor materials, and its influence on the charge collection efficiency. Finally, coupling the 3D electrode with the bio-photoanode by growing semiconductor photoanode materials on 3D carbon aerogel scaffold, the electrode offers the dual advantage of large surface area and light absorption capability.

The current invention directly interfaces the bio-photoanode with a semiconductor photocathode to form a "Z-scheme" MPS (see FIG. 6). To the inventor's knowledge, the "Z-scheme" MPS has not been demonstrated yet. This embodiment has two benefits. First, the integration of two semiconductor materials with optimal band-gap combination largely improve the solar light absorption. The addition of the photocathode also offers extra photovoltage to the MPS. Second, the device cost is greatly reduced by replacing the platinum counter electrode or platinum nanoparticle decorated carbon cloth electrode with low-cost semiconductor materials.

Figure 6A:
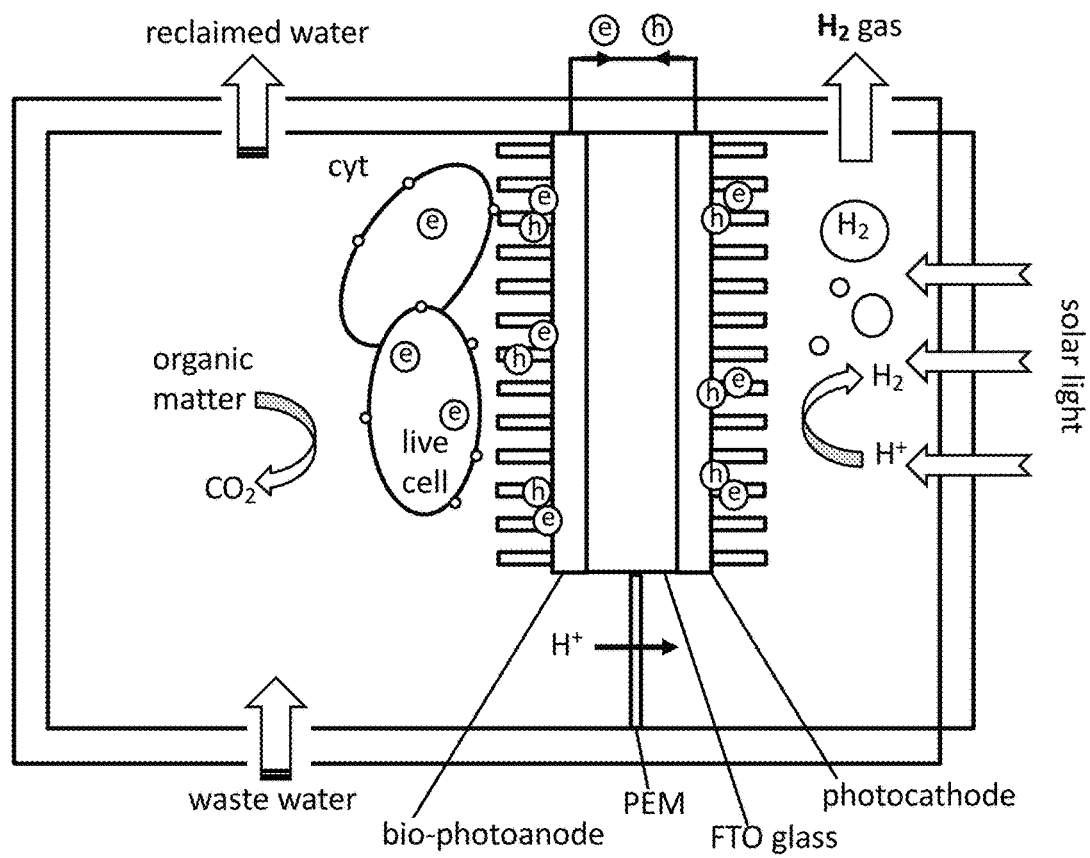
FIGS. 6A-6B show 6A a schematic configuration of a Z-scheme MPS, and 6B the corresponding energy diagram illustrates the carrier generation and transfer in the device, where the solid and empty dots represent electrons and holes, respectively, and further showing the electrons generated from bio-photoanode and photocathode, respectively, and the dashed lines represent the equilibrium Fermi level, according to one embodiment of the invention.
Figure 6B:
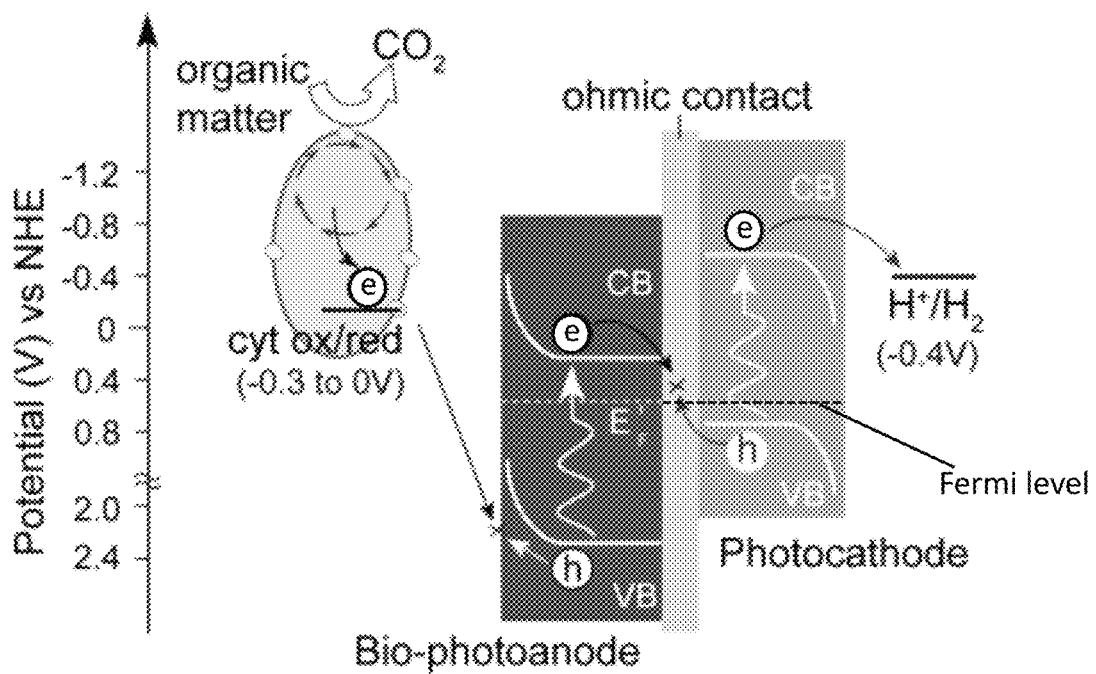

A dual-chamber MPS with a photocathode and a bio-photoanode separated by a proton exchange membrane (PEM) is provided, as shown in FIG. 6A. A photocathode is immersed in an anoxic buffered solution, and a bio-photoanode preinoculated with electrogenic bacterial strains, for example from wastewater, is used to generate electrons from organic wastes. The photoelectrodes are connected through an external circuit. In this exemplary device configuration, the expensive platinum electrode or platinum coated carbon electrode is not required. Under light illumination, photoexcited electron-hole pairs will be generated in both anode and cathode. As shown in FIG. 6B, the bio-electrons recombine with the photoinduced holes in the photoanode VB, while the photoinduced electrons from photoanode diffuse to and recombine with the photoinduced holes in the photocathode VB. Finally the photoinduced electrons in the photocathode CB reduce the protons to hydrogen. To balance the charge in the chambers, the protons generated in the bio-oxidation reactions diffuse from the anode chamber through the PEM to the cathode chamber. On the whole, two photons generate two electron-hole pairs. One electron-hole pair recombines, while the other pair is used for oxidation and reduction reactions. The total photovoltage of the MPS is the combination of the photovoltage of anode and cathode.

Figure 7:
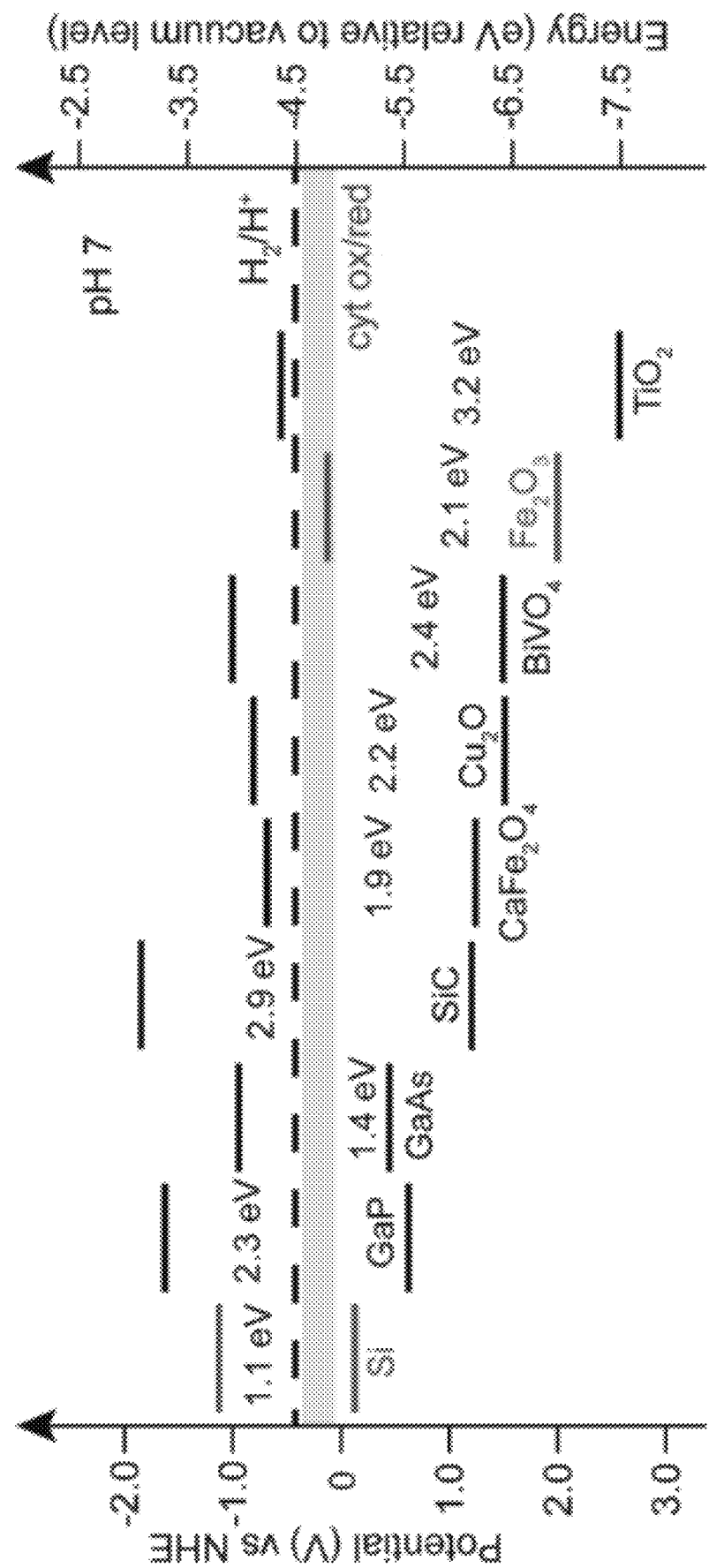
FIG. 7 shows a schematic diagram of the band-gap and relative energies of different semiconductors in terms of vacuum level and NHE, according to one embodiment of the invention.

For a spontaneous microbial electrohydrogensis process, in comparison to single band-gap MPS, the biggest advantage of Z-scheme MPS is the enhanced solar light absorption and photovoltage through the coupling of two distinct semiconductor photoelectrodes. Therefore the selection of photoelectrodes is critical to the overall performance of the MPS. To achieve spontaneous microbial electrohydrogensis, the photocathode CB has to be more negative than the proton reduction potential (−0.41 V vs. NHE at pH 7), and the photoanode VB should be more positive than the bacteria oxidation potential (−0.3-0V vs. NHE). The larger potential difference between these states will provide the larger driving force for the reactions. Furthermore, it is more favorable to have the semiconductor electrodes with an optimal band-gap combination for maximizing the solar energy absorption. FIG. 7 shows the band-gap and relative energies (vs. NHE) of several commonly used photoelectrodes. An exemplary Z-scheme MPS using $Fe_2O_3$ (2.1 eV) nanowire film as photoanode and Si (1.1 eV) nanowire array as photocathode is provided. The photoelectrodes are further decorated with low-cost Ni or NiFe based catalysts to reduce the over-potential for water oxidation and proton reduction. It is known that NiFe layered double hydroxide, exhibits high activity toward both the oxygen and hydrogen evolution reactions. The combination of $Fe_2O_3$ and Si enables the MPS system to harvest most of the sunlight. And recent reports on the $Fe_2O_3$ photoanode and Si photocathode for solar water splitting also strongly suggest that they are very stable in aqueous solution and have outstanding photoactivity.

The invention demonstrates for the first time a Z-scheme MPS. In comparison to previously developed solar-assisted microbial devices, the Z-scheme MPS significantly improve the utilization of solar energy. Moreover, the large photovoltage provided by the photoelectrodes facilitate the charge transfer, and achieve spontaneous microbial electrohydrogensis.

To achieve a sustainable and practically feasible MPS, it is critical to build the system based on low-cost earth abundant materials and to minimize the device fabrication and operation cost. In the existing MEC devices, the most costly components are platinum electrode or platinum decorated carbon cloth electrode and cation/proton exchange membrane. According to the Z-scheme MPS embodiment, the platinum electrode is replaced by a relatively low-cost semiconductor electrode, which substantially reduces the device cost. In one embodiment the MPS is prepared in the form of powder, which can be dispersed into wastewater to spontaneously generate hydrogen gas. In this embodiment, a "free-standing" MPS is provided that eliminates the cation/proton exchange membrane and the need of external circuit.

Figure 8:
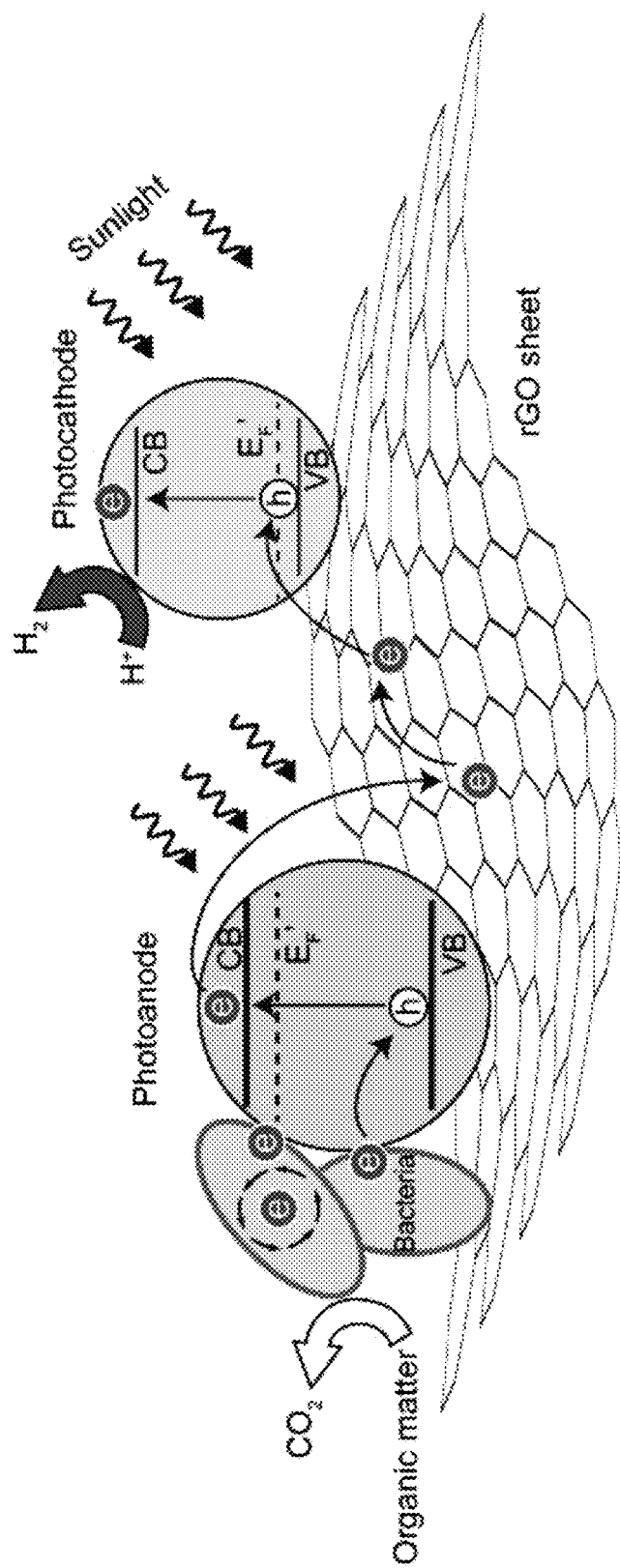
FIG. 8 shows a schematic diagram of a free-standing Z-scheme MPS, according to one embodiment of the invention.

According to one embodiment, a free-standing MPS based on the Z-scheme device configuration using p-Si nanowires and hematite nanoparticles as photocathode and photoanode, respectively is provided. Both the photocathode and photoanode are co-anchored on reduced-graphene oxide (rGO) sheets (see FIG. 8). Graphene oxide (GO) sheets are prepared from low-cost graphite powder using a modified Hummers and Offeman method. They are reduced by a number of methods to form highly conductive rGO sheets, which has relatively high electron mobility at room temperature. The rGO sheet functions as a substrate to host the semiconductor photoelectrodes (photocatalyst), as well as an efficient electron shuttle to transfer bio-electrons generated in bacteria to photocathode. In comparison to the conventional MEC devices, the absence of a membrane results in decreased internal resistance, and the reactions are longer limited by the rate of ion diffusion. The assembly of rGO sheets with semiconductor nanomaterials or bacteria (e.g., *Shewanella*) has been separately demonstrated. The current embodiment not only saves a substantial amount of the material and device fabrication cost, but also simplifies the device operation and maintenance.

Since free-standing MPS is a fundamentally new device concept, we anticipate that there are several possible technical challenges. Here the current embodiment addresses the following issues:

1) Possible contact between cathode and anode. The direct contact of photoanode and photocathode form a type II heterojunction, which causes the failure of the mechanism and a significant energy loss through electron-hole recombination. this issue is addressed by using a two-step growth approach. GO sheets are prepared by graphite powder using a modified method of Hummers and Offeman. p-Si nanowires are dispersed into the GO solution. Under light illumination, the photoexcited electrons generated in Si nanowires reduce the surrounding GO to form rGO sheets, and the wire is eventually covered with rGO sheets. Then n-$Fe_2O_3$ nanoparticles are deposited onto the as-synthesized Si/graphene composite by an appropriate coating method. In this case, anode and cathode are separated by the rGO sheet, and their inter-distance can be minimized.

2) Aggregation of graphene sheets. Photochemical stability is another important factor of the free-standing MPS. It is known that the graphene sheets are easily aggregate together due to its strong 7C-7C interaction. The aggregation causes a significant drop of effective surface area, and thus, the efficiency of collecting bio-electrons and photocatalytic hydrogen generation. Therefore, by immobilizing the graphene sheets onto a transparent plastic substrate a thin graphene film is formed. By putting the substrate in Si/rGO solution and allowing the solution to evaporate slowly, the rGO sheets adheres to the substrate to form the film. This aspect prevents the aggregation of graphene sheets as well as eliminates the tedious separation and recovery processes for the MPS.

3) Competing reactions in the wastewater. The composition of municipal wastewater is mainly water (>99.9%) and a complex mixture of different type of organic compounds and some inert inorganic solids. Since the reduction potentials of most organic compounds are higher than the proton reduction potential, they are not less favorable than the hydrogen evolution reaction (HER). The oxygen reduction reaction is the major competing reaction to HER. Without an external supply of oxygen, the dissolved oxygen in the wastewater will be removed rapidly.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the invention can potentially be used for generation of liquid fuels and chemicals.

What is claimed:

1. A microbial photoelectrochemical system comprising: a biophotoanode comprising an electrogenic bacteria strain and a photocathode, wherein the photocathode comprises InGaN, GaN, InP, GaP, Si, $Cu_2O$, or $CuBi_2O_4$.

2. The microbial photoelectrochemical system of claim 1, wherein the biophotoanode comprises a carbon aerogel.

3. The microbial photoelectrochemical system of claim 2, wherein the carbon aerogel has a mass density of 0.18-10 $mg/cm^2$, 40-60% porosity, and a surface area of at least 3000 $m^2/g$.

4. The microbial photoelectrochemical system of claim 2, wherein the carbon aerogel comprises pores with a dimeter of 0.5 to 10 μm.

5. The microbial photoelectrochemical system of claim 2, wherein the carbon aerogel is coated with a semiconductor.

6. The microbial photoelectrochemical system of claim 5, wherein the semiconductor comprises a metal oxide.

7. The microbial photoelectrochemical system of claim 1, wherein the biophotoanode comprises an n-type semiconductor.

8. The microbial photoelectrochemical system of claim, 7 wherein the biophotoanode comprises $Fe_2O_3$, ZnO, $WO_3$, $BiVO_4$, or $TiO_2$.

9. The microbial photoelectrochemical system of claim 8, wherein the biophotoanode valence band is <−0.3 V relative to a normal hydrogen electrode and where the photocathode conduction band is >0.41 V relative to a normal hydrogen electrode.

10. The microbial photoelectricochemical system of claim 7, wherein the n-type semiconductor comprises a valence band that is more positive than the oxidation potential of the bacteria.

11. The microbial photoelectricalchemical system of claim 1, wherein the bacteria is a *Shewanella* MR-1.

* * * * *